(12) United States Patent  
Ohme

(10) Patent No.: US 8,861,925 B1  
(45) Date of Patent: Oct. 14, 2014

(54) METHODS AND SYSTEMS FOR AUDIO-VISUAL SYNCHRONIZATION

(75) Inventor: Phillip J. Ohme, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 691 days.

(21) Appl. No.: 12/845,683

(22) Filed: Jul. 28, 2010

(51) Int. Cl.
*H04N 5/932* (2006.01)

(52) U.S. Cl.
USPC .......................................... 386/207; 386/228

(58) Field of Classification Search
None
See application file for complete search history.

(56) References Cited

U.S. PATENT DOCUMENTS

| 6,567,127 | B1 * | 5/2003 | Orr et al. ................... 348/478 |
| 2003/0208113 | A1 * | 11/2003 | Mault et al. ................ 600/316 |
| 2006/0168114 | A1 * | 7/2006 | Glatron et al. ............. 709/218 |
| 2007/0065122 | A1 * | 3/2007 | Chatterton ................... 386/126 |
| 2007/0283449 | A1 * | 12/2007 | Blum et al. ................... 726/28 |
| 2010/0142927 | A1 * | 6/2010 | Lim et al. ..................... 386/96 |
| 2011/0082572 | A1 * | 4/2011 | Ramakrishnan et al. ... 700/94 |
| 2011/0158606 | A1 * | 6/2011 | Lin et al. ..................... 386/248 |
| 2011/0170837 | A1 * | 7/2011 | Barnes, Jr. ................... 386/239 |
| 2011/0283316 | A1 * | 11/2011 | Chen et al. ................... 725/38 |
| 2012/0020644 | A1 * | 1/2012 | Wehrenberg ................ 386/247 |

* cited by examiner

*Primary Examiner* — William C Vaughn, Jr.
*Assistant Examiner* — Eileen Adams
(74) *Attorney, Agent, or Firm* — Vista IP Law Group LLP

(57) ABSTRACT

Audio-visual synchronization using retrieval of visual data through a network to enhance the content presented to the user and to provide the user with a more meaningful and engaging audio-visual experience. An audio player such as an electronic book reader or stereo plays an audio file. The audio file, whether in analog form as played through a speaker or in digital form, is provided to a controller, which scans the audio file to detect a trigger or cue identifying visual data stored in a data store or database that is local or accessible through a network. The controller accesses the data store or database, downloads the pre-determined visual data, and controls the audio player and display such that playing of audio data and display of the retrieved visual data are synchronized with each other.

32 Claims, 16 Drawing Sheets

| Trigger | Visual Data |
|---|---|
| Trigger 1 | Visual Data 1 |
| Trigger 2 | Visual Data 2 |
| Trigger 3 | Visual Data 3 |
| Trigger n | Visual Data n |

FIG. 12A

| Trigger | Visual Data |
|---|---|
| "Chapter 1" | Image 1 |
| "Chapter 2" | Image 2 |
| "Chapter 3" | Image 3 |
| "Chapter 4" | Image 4 |

FIG. 12B

METHODS AND SYSTEMS FOR AUDIO-VISUAL SYNCHRONIZATION

BACKGROUND

Electronic media is becoming increasingly popular compared to traditional paper media, particularly as more people utilize computers and mobile communication devices such as Smartphones to send and receive information. Certain types of information including audio data, however, have inherent limitations due to the nature of the data and the manner in which the data is presented to a user. For example, the content and user experience provided by presentation of audio data can be limiting due to the user only being able to listen to audio data rather than using other senses. These limitations may result in less effective conveyance of the message within the audio data to the user and diminished user experience.

One example of known audio data is in the form of an audio book, which is a recorded reading of a book by another person. The reading can be recorded to a Compact Disc (CD) or downloaded from a website and played back with an audio player such as a CD player or mp3 player. A user can listen to an audio book while engaging in various activities and while at various locations, e.g., while driving an automobile, exercising or while on an airplane. Book-related data may also be in the form of an e-book that is normally displayed on and ready by a user with a portable e-book reader such as KINDLE available form Amazon, eReader available from Barnes & Noble or a mobile communication device such as a Smartphone having e-book capabilities. E-book readers may be used to download e-books from a website or database hosting e-books. Text of an e-book can be adapted for audio presentation by converting the text into speech, which can be played to the user of the portable e-book reader or Smartphone.

Users can also download a non-streamed webcast or podcast to a user computer, a mobile communication device such as a Smartphone or mobile computing device such as an IPOD, IPHONE, IPAD, which may also be capable of wireless or cellular communications. With a podcast, a list of audio files is maintained at a server as a web feed, and a user utilizes software to access the web feed and may store the files locally to the user's computing device so that the user can listen to the audio at a later time. A user may also download or purchase mp3 or compressed audio files that can be played with mp3 or other audio players or computing devices such as such as IPODs.

While devices and audio data formats such as audio books, e-books and e-readers, mp3 files, podcasts and other types of audio data and audio players have greatly expanded how audio content is delivered to users, the experience of the users is still limited since listening to audio can be monotonous as a result of the singular dimension of the information presented and lack of engagement of other senses. Further, the convenience of certain types of audio data and audio players comes at a price of not being able to view images related to the audio data and that may be very informative since "A picture is worth a thousand words."

For example, a professor may record a class lecture and make the recorded lecture available for download as an audio podcast. While the recorded lecture may suffice for certain subject matter, the lecture may have involved presentation of charts, graphs and images. Thus, an audio podcast, while informative, does not capture all of the content of the lecture due to the absence of charts, graphs and images. For this reason, the professor may have to prepare and upload a separate presentation with the charts and graphs discussed during the lecture, e.g. in the form of a POWERPOINT presentation. Students, however, may or may not be able to view the POWERPOINT presentation and are nevertheless required to search through and follow the lecture with a separate document, which is not convenient. Similar issues apply in different environments including an office environment in which presentations are made to prospective clients and co-workers.

SUMMARY

Embodiments relate to synchronizing visual data with audio data played by portable or mobile audio players such that audio outputs are enhanced with visual data that is not available within the original audio data and is instead retrieved or downloaded from a data store or database that is local or remote and accessible through a network. The retrieved or downloaded visual data is displayed with audio data, thereby enhancing the audio content presented to a user to provide for a richer and more meaningful communication to and experience for the user.

Embodiments enhance audio outputs by detecting a trigger or cue within audio file or data, which may be a pre-determined word, phrase, tone or other indicator. The trigger may be part of original, unmodified audio output or data that has been added to and embedded within the audio data. Upon detection of the trigger or cue, a data store or a database having visual data is accessed. The data store or database may be local or accessible through a network and managed by a host computer. One or more pre-determined images or a series of images that is to be displayed with a particular audio segment is identified or selected and retrieved or downloaded from the local or remote data store or database. The pre-determined image is then presented with the audio segment.

For seamless presentation of audio data and visual data synchronized with the audio data, audio data can be analyzed in real time during playing of a first audio segment such that visual data for that first audio segment is retrieved or downloaded during playing of the audio segment and presented shortly after the first audio segment begins, during a middle portion of the first segment or during an end portion of the first segment. The same visual data may also be displayed during playing of the next audio segment. In other embodiments, the first audio segment is utilized to access the data store or database and retrieve or download visual data such that when a subsequent, second audio segment is to be played, the visual data for that second audio segment is ready to be displayed with playing of the second audio segment. Thus, the retrieved or downloaded visual data can be displayed before the second audio segment even begins or at other times. Embodiments may be utilized to enhance text and audio outputs of various devices in various environments including mobile communication devices, electronic book readers, and playing of audio files such as music and electronic books within environments such as an automobile.

One embodiment is directed to an audio-visual synchronization method that comprises receiving an audio file from a source at a controller. The audio file is also provided to an audio player of a user. The method further comprises identifying a trigger at a pre-determined location within the audio file with the controller. Thus, the pre-determined location is fixed within the audio data. The method further comprises accessing a data store or database that is local or accessible through a network and that stores visual data. The method further comprises identifying pre-determined visual data based at least in part upon the identified trigger. The audio file is played by the audio player and the pre-determined visual data is provided to a display such that the visual data is displayed with a pre-determined segment of the audio file played by the audio player.

A further embodiment is directed to an audio-visual synchronization method that comprises downloading an electronic book file to a portable electronic book reader through a first network. The electronic book reader includes an audio player for playing the electronic book file to a user as an audio file. The method further comprises identifying a trigger at a pre-determined location within the e-book or audio file with a controller, accessing a data store or database of visual data, e.g., from a computer accessible through a second network, and identifying pre-determined visual data based at least in part upon the identified trigger. The pre-determined visual data is provided to a display of the electronic book reader such that the visual data is displayed while a pre-determined segment of the electronic book file is played by the audio player.

Another embodiment is directed to an audio-visual synchronization method and comprises modifying an audio file by inserting a pointer at a fixed, pre-determined location within the audio file and uploading the modified audio file to a source of audio files. The method further comprises receiving, at a controller, the modified audio file from the source, wherein an audio player of a user also receives the audio file. The method further comprises identifying the pointer at the pre-determined location with the controller. After the pointer is identified, a data store or database, which may be local or accessible through a network, is accessed. Pre-determined visual data is identified based at least in part upon the identified pointer, and the audio file is played with the audio player and the pre-determined visual data is provided to a display such that the visual data is displayed with a pre-determined segment of the audio file played by the audio player.

Yet another embodiment is directed to an audio-visual synchronization system that comprises an audio player, a controller, a display and a database including visual data. Certain embodiments may also include an audio player. The controller is operably coupled to the audio player, both the audio player and the controller are configured to receive an audio file from a source, and the controller is also operably coupled to the display and the database, which may be a local database or accessible through a network. The controller is configured to identify a trigger or cue at a pre-determined location within the audio file, access the database, identify pre-determined visual data based at least in part upon the identified trigger, provide the pre-determined visual data to the display and control the audio player and the display such that the pre-determined visual data is displayed with a pre-determined segment of the audio file.

A further embodiment is directed to an audio-visual synchronization system comprising a portable electronic book reader such as an IPAD available from Apple Inc., KINDLE available from Amazon, Inc. and eReader available from Barnes & Noble. The book reader includes a controller that is used to download an electronic book or audio file to the electronic book reader through a first network. The electronic book reader includes an audio player so that the user can either read the book displayed by the reader or use an audio player and speaker of the reader to listen to the book. The audio data may be a previous recording of the book read by another person or text-to-speech conversion. The reader includes a controller that may include a synchronization program to identify a trigger or cue at a pre-determined location within the audio file, access a database of visual data that may be a local data store or database (e.g. previously downloaded to the reader) or accessible through a second network accessible by the electronic book reader, and identify pre-determined visual data based at least in part upon the identified trigger. The pre-determined visual data is provided to a display of the electronic book reader such that the visual data is displayed while a pre-determined segment of the electronic book file is played by the audio player. Thus, rather than displaying only text or playing only audio, an e-book reader is enhanced by displaying visual data retrieved from a network.

System embodiments may also involve an audio file that has been modified by embedding or inserting data or one or more pointers at respective pre-determined locations within the audio file. The modified audio file is uploaded to a source of audio files such as a website or other source from which audio files such as mp3 files, electronic books and other audio files can be downloaded by the controller when the controller detects a trigger.

Further embodiments are directed to computer programs that may be stored on computer program products including a non-transitory, computer readable storage medium having instructions which, when executed by a computer system, cause a controller to implement method embodiments. The computer program product may store a synchronization program that is executed by a controller to control and synchronize an audio player and a display.

In a single or multiple embodiments, the audio file is received at the controller from an Internet source such as a server or website. For example, the audio file may be a music file, audio data of a podcast, or electronic or audio book file that is downloaded from a website. The source of the audio file may also be a portable electronic or optical storage media such as a Compact Disc, a Flash memory or a USB drive, or a hard drive. The source may be remote or not physically accessible or the source can be carried by a user or part of an automobile. Within an automobile, the audio data may be played by a stereo system of the automobile, and visual data retrieved by accessing a data store or database such that is local (e.g. stored to a hard drive of the automobile) or accessible through a network may be displayed by a display unit such as a heads up display, which displays an image on a windshield of an automobile or navigation, entertainment or other displays within the automobile. The visual data may be a single image, a series of images or a video.

In a single or multiple embodiments, audio files that are played by an audio player in the form of a mobile communication device such as a Smartphone or IPAD that is capable of wireless or cellular communications and that may be used to retrieve an audio file and/or to retrieve visual data from a database.

In a single or multiple embodiments, the trigger may be part of the original, unmodified audio file (e.g., a particular word or phrase of the audio data or file). In these embodiments, the controller may include or receive an output of a microphone that is used to detect analog outputs of a speaker. The controller may utilize voice recognition software to detect certain words or phrases without the speaker output. In an alternative embodiment, the controller can be provided with digital data that is read or scanned for a pre-determined word or phrase such that the trigger is detected independently of sounds generated by a speaker of the audio player, which may be beneficial if background noise is an issue or if a speaker or microphone is not available. Embodiments may also involve a trigger or cue in the form of a particular track time of the audio file (e.g., at 3 minutes, 32 seconds into the audio file) such that at or by that time, visual data associated with that particular audio segment has been retrieved and is ready to be displayed or is the process of being retrieved and displayed. Further, the trigger or cue may be in the form of data that is added to a pre-determined location within the audio file.

Thus, with embodiments, the triggers at a fixed, pre-determined location must be read by the controller in order to allow the controller to access the database and retrieve corresponding visual data. This is in contrast to other voice recognition software or song recognition software that do not depend upon and are not based upon triggers within the audio file itself and triggers located at fixed, pre-determined locations within the audio file.

Audio data may be scanned while it is played or in advance of being played. For example, an audio book may be scanned 10 pages ahead such that pre-determined visual data related to the next chapter is retrieved or downloaded in advance and stored in a memory or queue and ready to be displayed to the user. Thus, pre-determined visual data may be retrieved from the database and displayed at various times including before playing of the pre-determined segment begins or at the beginning or during playing of an audio segment.

In a single or multiple embodiments, visual data that is downloaded from the database may be displayed for a pre-determined time or for as long as the audio data indicates, e.g., via a subsequent trigger which serves to notify the controller when to stop displaying the pre-determined visual data.

In a single or multiple embodiments, the audio player, controller and display may be separate components. In other embodiments, the same device plays the audio file and displays the pre-determined visual data, and the same device may also include the controller. For example, an electronic book reading device such as an IPAD or KINDLE configured according to embodiments may play audio of an electronic book while also displaying the retrieved pre-determined visual data on their respective display screens. In other embodiments, the different devices play the audio file and display the pre-determined visual data. For example, in an automobile, the automobile stereo system may be utilized to play an audio file, whereas a heads up display or other display screen is utilized to display retrieved or downloaded pre-determined visual data. Further, a device may be utilized to play audio data whereas a nearby display device such as a television or computer screen may be utilized to display the pre-determined visual data.

In a single or multiple embodiments, the pre-determined visual data comprises an image or series of images or video that relates to the article or story being audibly presented to the user. In other embodiments, the visual data may be an advertisement that is presented with certain audio data. For example, a portion of an electronic audio book may involve a couple driving off into the sunset, and a trigger or phrase involving this part of the electronic book may be utilized to retrieve an image of a convertible or an advertisement for an automobile. Thus, embodiments may be used for personal, entertainment and/or commercial or business-related purposes.

BRIEF DESCRIPTION OF THE DRAWINGS

The foregoing and other aspects of embodiments are described in further detail with reference to the accompanying drawings, wherein:

FIG. 6A-B illustrates one example of how embodiments may be implemented by triggers or pointers that are based on content of original, unmodified audio data, wherein FIG. 6A illustrates triggers or pointers that identify book chapters, and FIG. 6B illustrates one example of how embodiments may be implemented to identify a certain company name within audio news;

FIGS. 10A-C illustrate examples of how audio data can be read or scanned to identify triggers based upon certain words, groups of words or phrases;

FIGS. 12A-B illustrates a table including triggers and associated pre-determined visual data that can be part of a database stored on a host computer that is accessible by a controller, wherein FIG. 12B provides a specific example in which triggers are based on "Chapter" phrases and the table identifies respective images to be displayed with new chapters of an audio book or e-book;

DETAILED DESCRIPTION OF ILLUSTRATED EMBODIMENTS

Embodiments relate to analyzing data of a first data type or format that is presented to a user to determine data of a second data type or format, retrieving data of the second data type or format from a local data store or database or from a data store or database that is accessible through a network, and presenting different types of data to the user in a synchronized manner. One embodiment involves synchronizing visual data with audio data played by audio players such that audio outputs are enhanced with visual data retrieved or downloaded from a data store or database during or before audio is played such that the visual data is displayed during playing of audio. In this manner, embodiments enhance traditional text-based and audio-based devices by providing richer content to a user and a more meaningful, engaging and interesting user experience with accompanying visual data.

Figure 1:
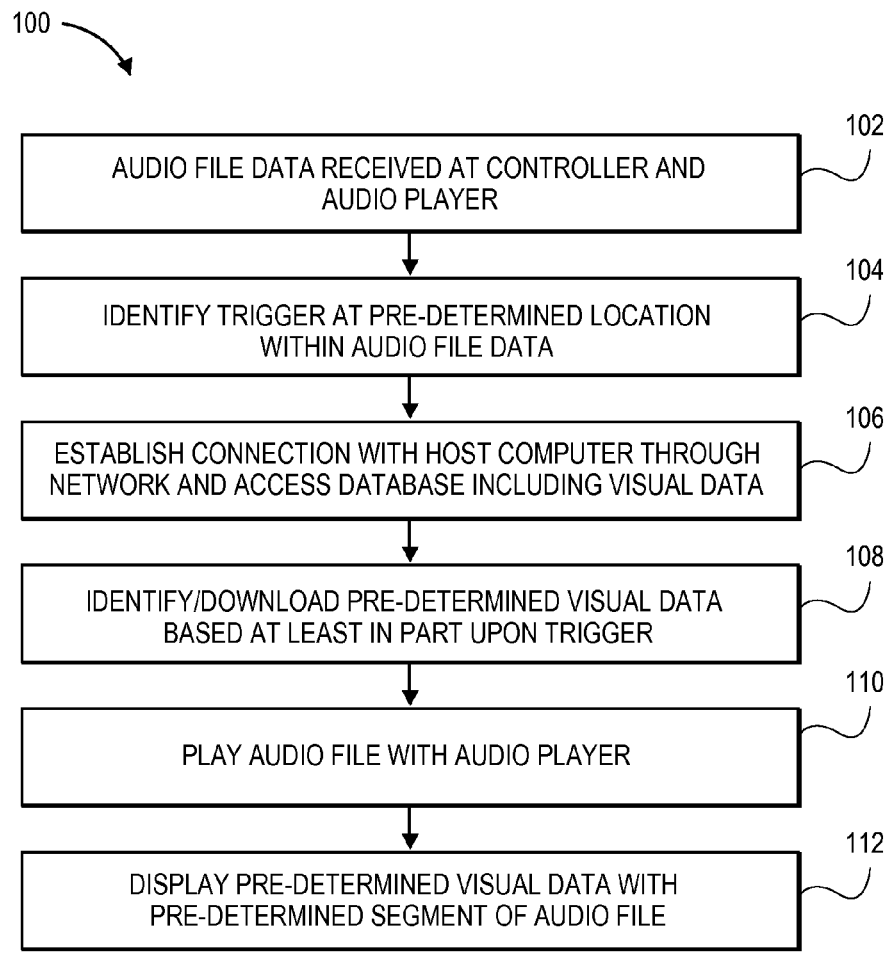
FIG. 1 is a flow chart of one embodiment of a method for synchronizing audio and visual data.

For example, referring to FIG. 1, one embodiment a method 100 of synchronizing different types of data comprises at 102, receiving data of an audio file at a controller or audio file analyzer, which is also provided to an audio player. At 104, the controller reads or scans the audio file data, which may be in the form of a stream of bits, to identify a trigger or cue. The trigger or cue is at a fixed, pre-determined location within the audio file and indicates the point at which visual data should be retrieved/displayed. At 106, after identifying a trigger, the controller accesses a local data store or database or establishes a connection with a database through a network and searches the database to identify and download visual data that was previously determined to be linked to or associated with the identified trigger at 108. At 110, the audio file is played with the audio player, and at 112, the visual data is displayed with a pre-determined segment of audio file such that the visual data is displayed with or synchronized with the audio data after the trigger or cue. Further embodiments and aspects thereof are described in further detail with reference to FIGS. 2-15.

Figure 2:
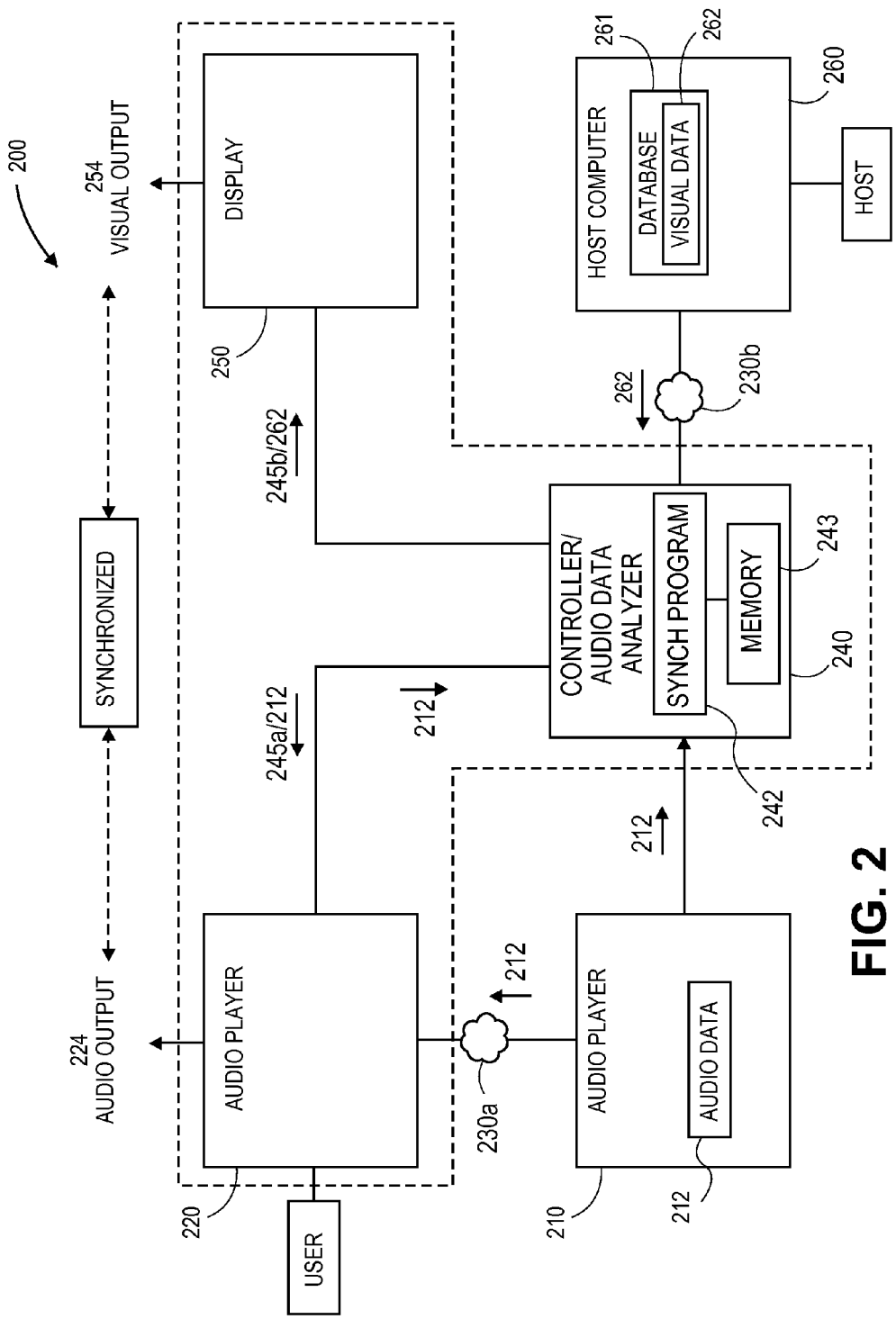
FIG. 2 illustrates a system constructed according to one embodiment for synchronizing audio and visual data.

Referring to FIG. 2, a system 200 constructed according to one embodiment for synchronizing different types of data such as audio and visual data comprises or involves a source 210 of audio files or audio data 212 (generally, "audio data"), an audio data player 220 that receives audio data 212 from source 210 and generates an audio output 224. Source 210 may also be a server or website, and audio player 220 may be in communication with the server or website through a network 230a so that audio player 220, which is capable of wireless or cellular communications, can download audio file 212 from source 210.

Network 230a and other networks discussed herein (generally, network 230) may be different, or two or more networks 230 may be the same depending on system 200 configuration and communication device and communication protocols employed. One or more or all of networks 230 may be, for example, a cellular network or a wireless network, e.g., WiFi or wireless local area networks that utilize the 802.11 wireless standard, wireless networks available in public places such as a library, a coffee shop, etc., a Global System for Mobile Communications (GSM) network, a code division multiple access (CDMA) network, or a time division multiple access (TDMA) or other suitable wireless or cellular networks capable of wirelessly connecting two computing or communication devices. For ease of explanation, reference is made generally to network 230.

In certain embodiments, source 210 may be storage media including an audio file 212 that is received and played by audio player 220. For example, embodiments may involve music data stored on a Compact Disc (CD) and played by a CD player within an automobile, on a computer, in a user's home or with a portable music device. Embodiments may also involve other types of music files such as mp3 files and other compressed files as well as uncompressed audio files that may be downloaded from websites and other sources 210 and stored to various types of storage media including flash memory such as USB drives and CDs. Embodiments may also involve audio books including audio books and text-to-speech versions of e-books that can be audibly played by a Smartphone or portable e-book reader such as KINDLE available form Amazon or eReader available from Barnes & Noble. Further, embodiments may involve other types of audio data 212 that can be downloaded via the Internet such as a podcast or non-streamed webcast and audio web fees such as audio RSS web feeds.

Thus, the type and source 210 of audio data 212 may vary depending on, for example, user access to available sources 210 and the type of audio player 220 utilized. Accordingly, it should be understood that embodiments may involve audio data 212 that is provided to audio player 220 from a source 210 such as a portable storage media or downloaded from source 210 such as a website or server that hosts music and e-book files to an audio book player, an e-book player, an mp3 and other music or audio player 220. Accordingly, the above examples are provided to illustrate types of sources 210, audio data 212 and audio players 220 that embodiments may utilize, and for ease of explanation, reference is made generally to these components or to specific types thereof as examples of how embodiments may be implemented.

System 200 comprises or involves a controller or audio data analyzer 240 (generally, "controller" 240). Controller 240 may be implemented as hardware, software, e.g., as a synchronization program 242 as shown in FIG. 2, or a combination thereof. For ease of explanation, reference is made to controller 240 or synchronization program 242.

In certain embodiments, controller 240 is in communication with audio player 210 (directly or via a network not illustrated in FIG. 2) to control audio player 220 and/or to receive audio data 212 from audio player 210 as an input to controller 240. Controller 240 generates one or more signals our outputs 245a that are provided to audio player 220 to control audio player 220. Output 245a may also include the audio data 212 to be played by the audio data as generally illustrated in FIG. 1.

In certain embodiments, controller 240 may also be in communication with source 210 to receive audio data 212 from the source 210, e.g., based on source 210 location information provided by audio player 210 before audio data 212 is played or from audio player 220, e.g., while audio data 212 is played or before audio data 212 is played such that the audio data 212 is in the same form as received from source 210. Thus, FIG. 1 illustrates controller 240 being able to receive audio data 212 from source 210 and/or audio player 220 depending on the system configuration employed and configuration of audio player 220.

As shown in FIG. 2, controller 240 is also in communication with visual data player or display 250 that generates a visual output 254 in the form of an image or video (generally "display" that is directly or via a network (not illustrated in FIG. 2). Controller generates one or more signals our outputs 245b that are provided to display 250 to control display 250. Output 245b may also include visual data 262 to be displayed as generally illustrated in FIG. 1.

Controller 240 is also in communication with a data store or database, which may be local or hosted by a computer 260 (as shown in the embodiment illustrated in FIG. 2) that may be managed by a host and includes a database 261 of visual data 262. Visual data 262 is defined herein to include an image, a series of images or a video associated with or related to a pre-determined segment of an audio data 212. Audio data 212 and visual data 262 are defined herein to be mutually exclusive due to different user senses being utilized to interpret these different types of data in different ways using different types of electronic devices.

In the embodiment illustrated in FIG. 2, audio player 220, controller 240 and display 250 are configured such that controller 240 receives audio data 212 in digital format either from source 210 directly or from audio player 220 (before audio player 220 plays audio data 212). Based in part upon the received digital audio data 212, controller 240 controls audio player 220 with output 245a and controls display 250 with output 245b.

Figure 3:
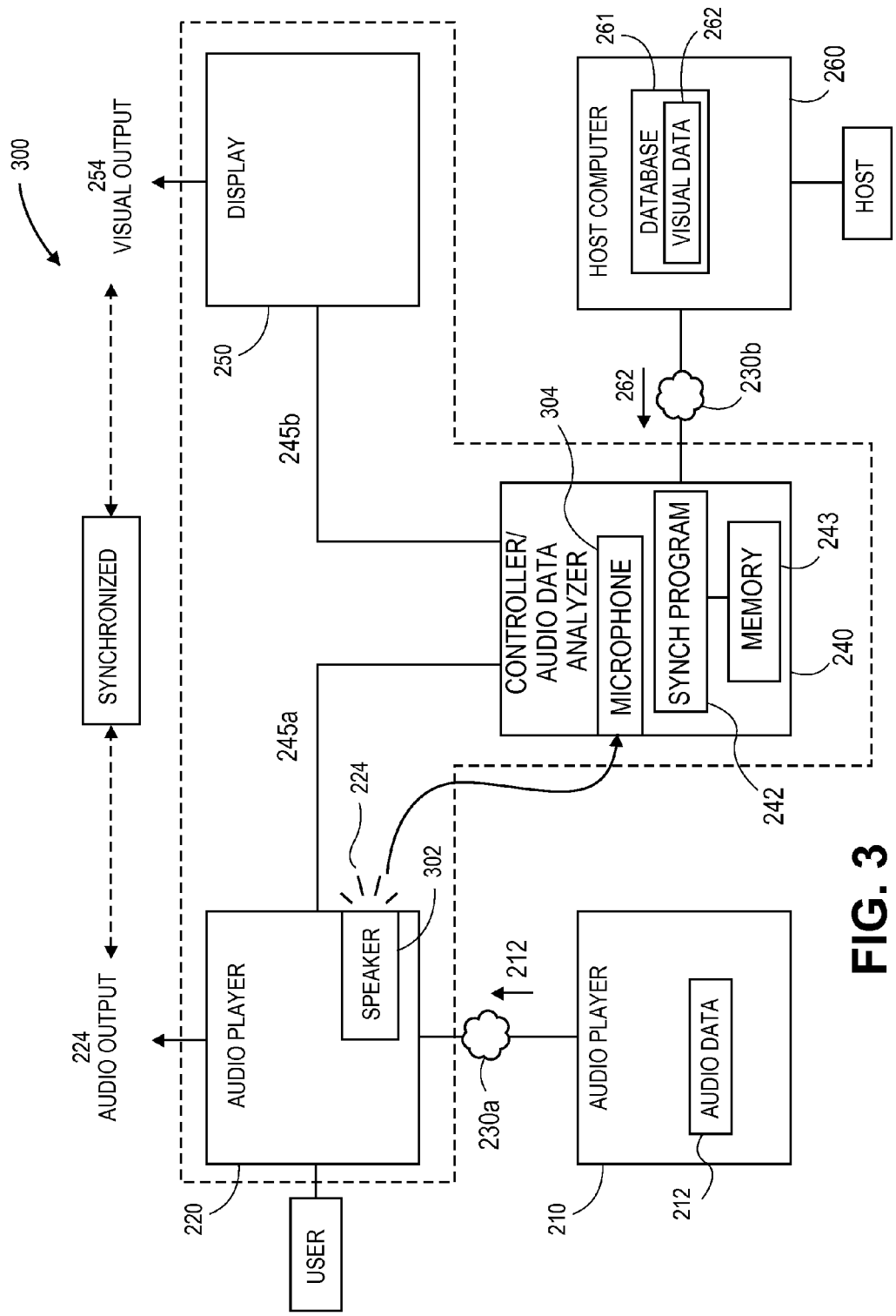
FIG. 3 illustrates another system constructed according to one embodiment for synchronizing audio and visual data based on an audible output of an audio device.

In another system 300 embodiment, referring to FIG. 3, controller 240 is operably coupled to or in communication with audio player 220 but receives audio data 212 that has been played by the audio player 220 and thus is in analog format rather than digital format. In this embodiment, audio data 212 is provided to audio player 220, which generates signals to drive a speaker 302 that emits an analog output or sounds 224. Controller 240 includes a sound detection device 304 or microphone to detect analog sounds 304 generated by speaker 302, which serve as input to controller 240.

FIGS. 2 and 3 illustrate audio player 220, controller 240 and display 250 as separate components. While embodiments may be implemented in this manner, other embodiments may involve integrating some or all of these components into a single device (as generally illustrated by dashed line surrounding audio player 220, controller 240 and display 250). For example, a single device may include audio player 220 and controller 240, display 250 and controller 240, or audio player 220, display 250 and controller 250. Embodiments may involve integration of system components within a home or automobile stereo system, an IPAD, audio book player, e-book reader or other device capable of presenting audio-visual information to a user and, in certain embodiments, capable of wireless or cellular communications. Components that are not integrated within a single device can be connected appropriately, e.g., via a suitable network connection. Accordingly, FIGS. 2-3 are provided to generally illustrate system components and how they may be configured, but it should be understood that embodiments may involve other system configurations, and that system components may be parts of different devices or integrated into the same device.

Figure 4:
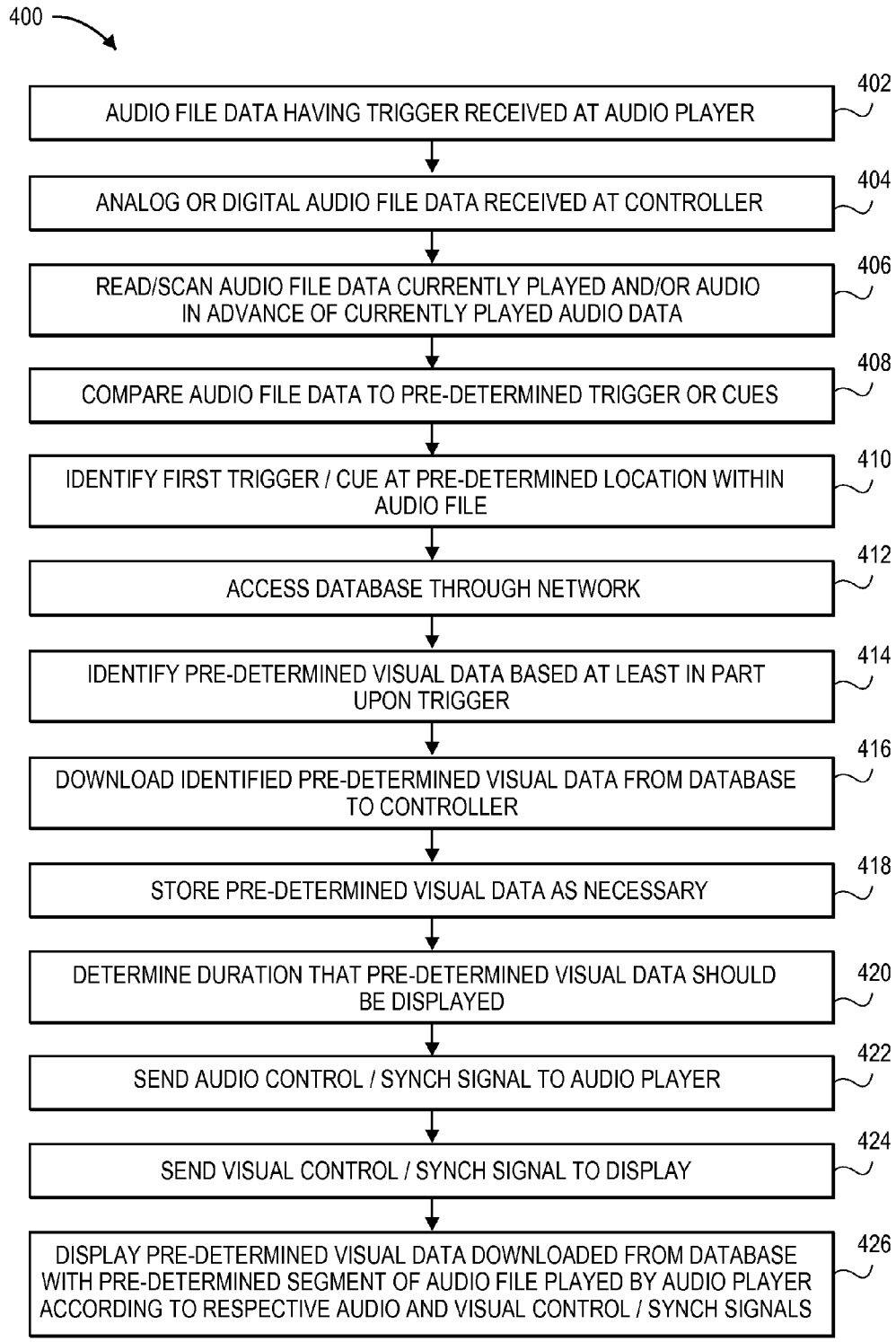
FIG. 4 is a flow chart of another embodiment of a method for synchronizing audio and visual data.

Referring to FIG. 4, one embodiment of a method 400 for performing audio-visual synchronization using system components and configurations illustrated in FIGS. 2-3 comprises, at 402, receiving audio data 212 as an input to audio player 220, and 404, receiving audio data 212 as an input to controller 240.

Figure 5:
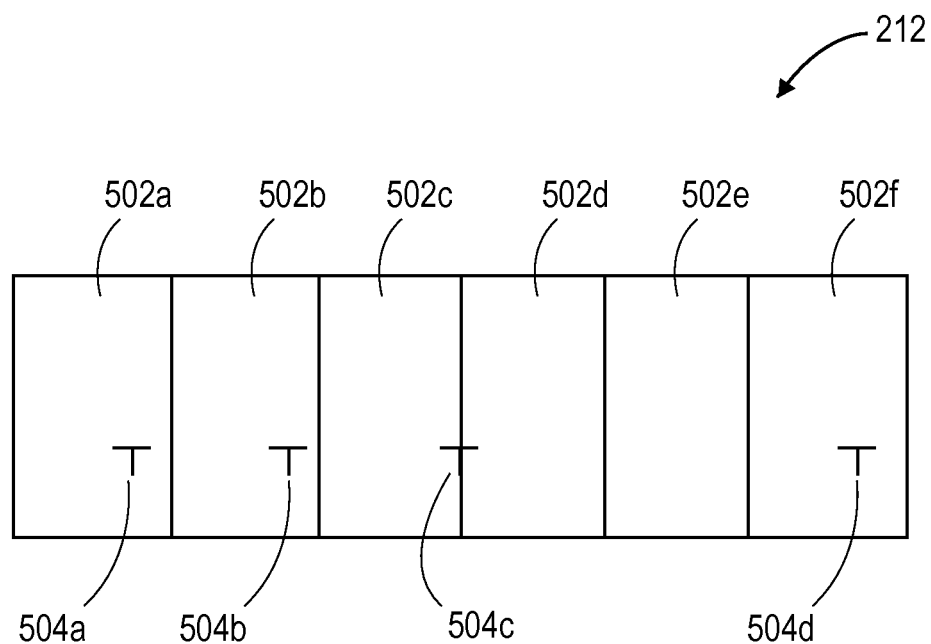
FIG. 5 generally illustrates audio data or an audio file having audio data segments and certain segments being associated with triggers or pointers according to one embodiment.

Referring to FIG. 5, audio data 212 is generally illustrated as a bit stream including multiple bits or segments 502a-f (generally, segment 502). For example, in the context of an audio book or e-book, segments 502 may represent different chapters, pages or paragraphs, and in the context of a song, segments 502 may represent different verses. According to embodiments, and as generally illustrated in FIG. 5, audio data 212 also includes one or more triggers, pointers or cues 504a-d (illustrated as trigger "T" in FIG. 5 and generally referred to as trigger 504), at particular, fixed, pre-determined locations within audio file 212. Triggers 504 are associated with or related to a particular audio file segment 502 and may be associated with or related to different portions of an audio segment 502, e.g., the beginning, end or a middle portion. Audio file triggers 504 may take various forms according to embodiments.

Figure 6A:
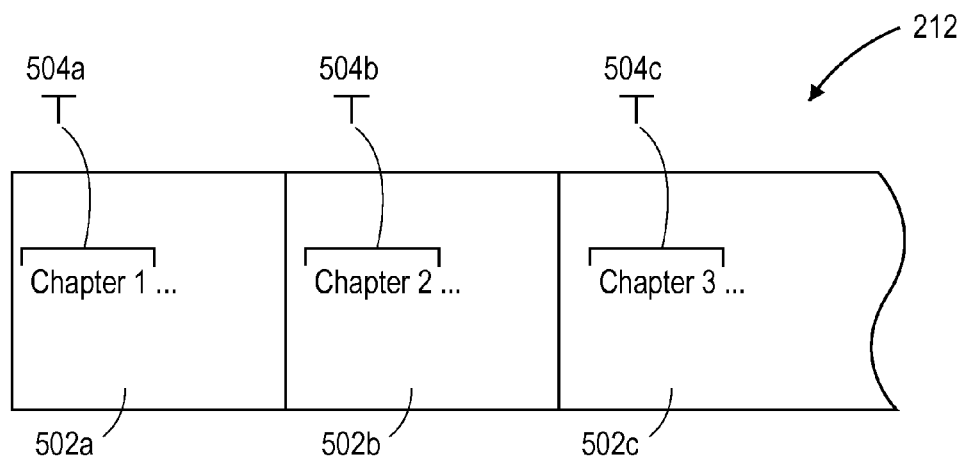
Figure 6B:
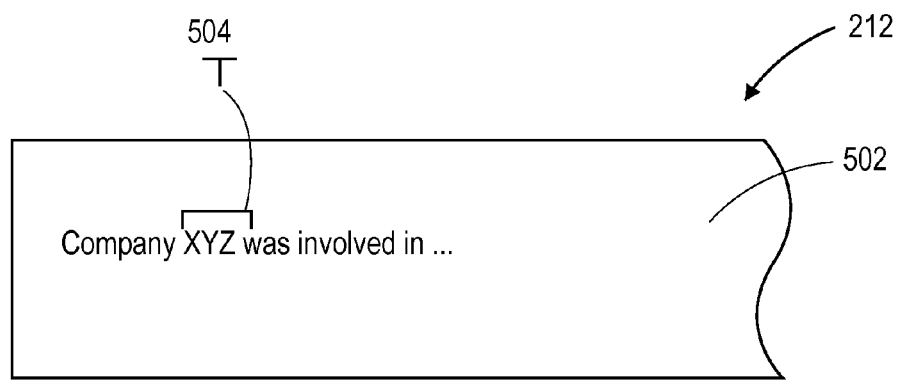
Figure 7:
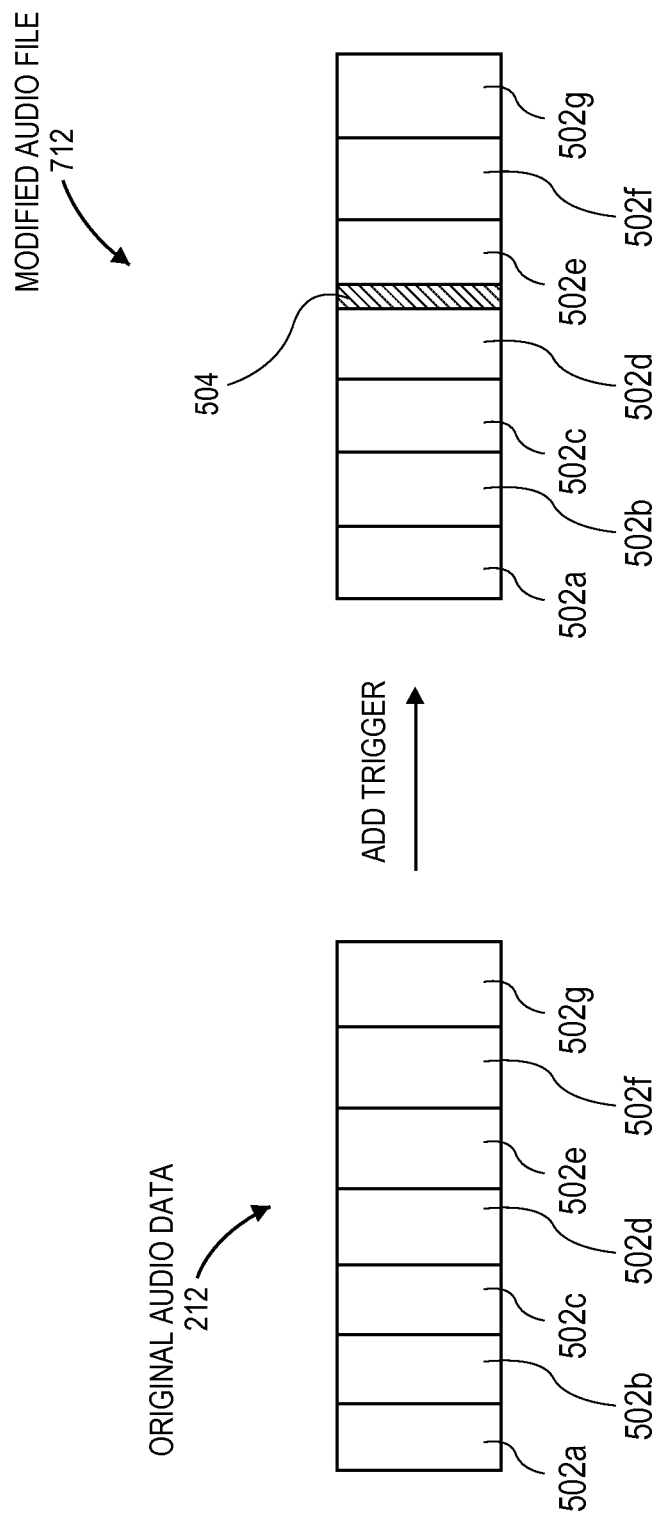
FIG. 7 illustrates how a trigger or pointer can be embedded within an unmodified, original audio data for use in audio-video synchronization according to another embodiment.

In one embodiment, referring to FIGS. 6A-C, trigger 504 is an original, unmodified portion of audio data 212, e.g., a word, number or phrase of the audio data 212 that is played by the audio player 220. The word, number or phrase may be part of the digital data provided to controller 240 directly from audio file source 210 or part of the analog output of audio player speaker 302. For example, referring to FIG. 6A, in the context of an audio book or e-book, trigger 504 may be a phrase involving "Chapter" such as "Chapter 1," Chapter 2," "Chapter 3," and so on or a character in a book. As another example, referring to FIG. 6B, trigger 504 may be a name of a certain business item or company name in audio data 212 related to business book or publication. It will be understood that trigger 504 can be various words and phrases of an original, unmodified audio file or audio data 212.

According to another embodiment, as generally illustrated in FIGS. 7A-B, trigger 504 is additional data that is embedded within audio data 212 at a pre-determined location within audio data. In this embodiment, trigger 504 may be transparent to audio player 220 such that it is not included in an output generated by audio player 220 (i.e., trigger 504 cannot be heard). FIG. 7A generally illustrates original, unmodified audio data or file 212, and FIG. 7B illustrates modified audio data or file 712 and trigger 504 embedded at a pre-determined location within audio data 212. Trigger 504 may, for example, be embedded into the audio data 212 by the host of the computer 260 that includes the database 261.

Figure 8:
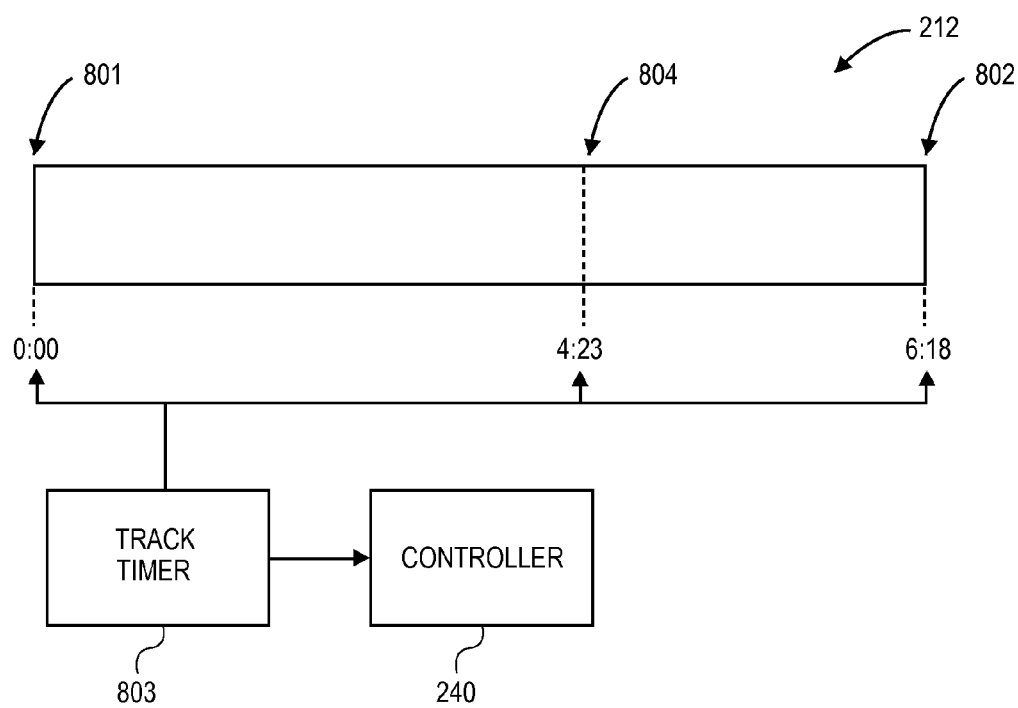
FIG. 8 illustrates an embodiment in which a trigger or pointer is in the form of a track time of an audio file.

Referring to FIG. 8, according to another embodiment, trigger 504 is a pre-determined time 804 the audio data 212 is played. The audio data 212 plays from a start time 801 of 0:00 to an end time of 6:18 (as an example), and the progress of playing audio data 212 is determined or measured by track timer 803 (e.g. as utilized in CD players to indicate time lapsed or time remaining on a particular track), the output of which may be provided to controller 240. Trigger 504 may be at the start time 801, end time 802 or at an intermediate time 804 such as 4:23 in the example. In this embodiment, trigger 504 is not actually part of the audio data 212 in contrast to triggers 504 described above with reference to FIGS. 6A-7B.

Figure 9:
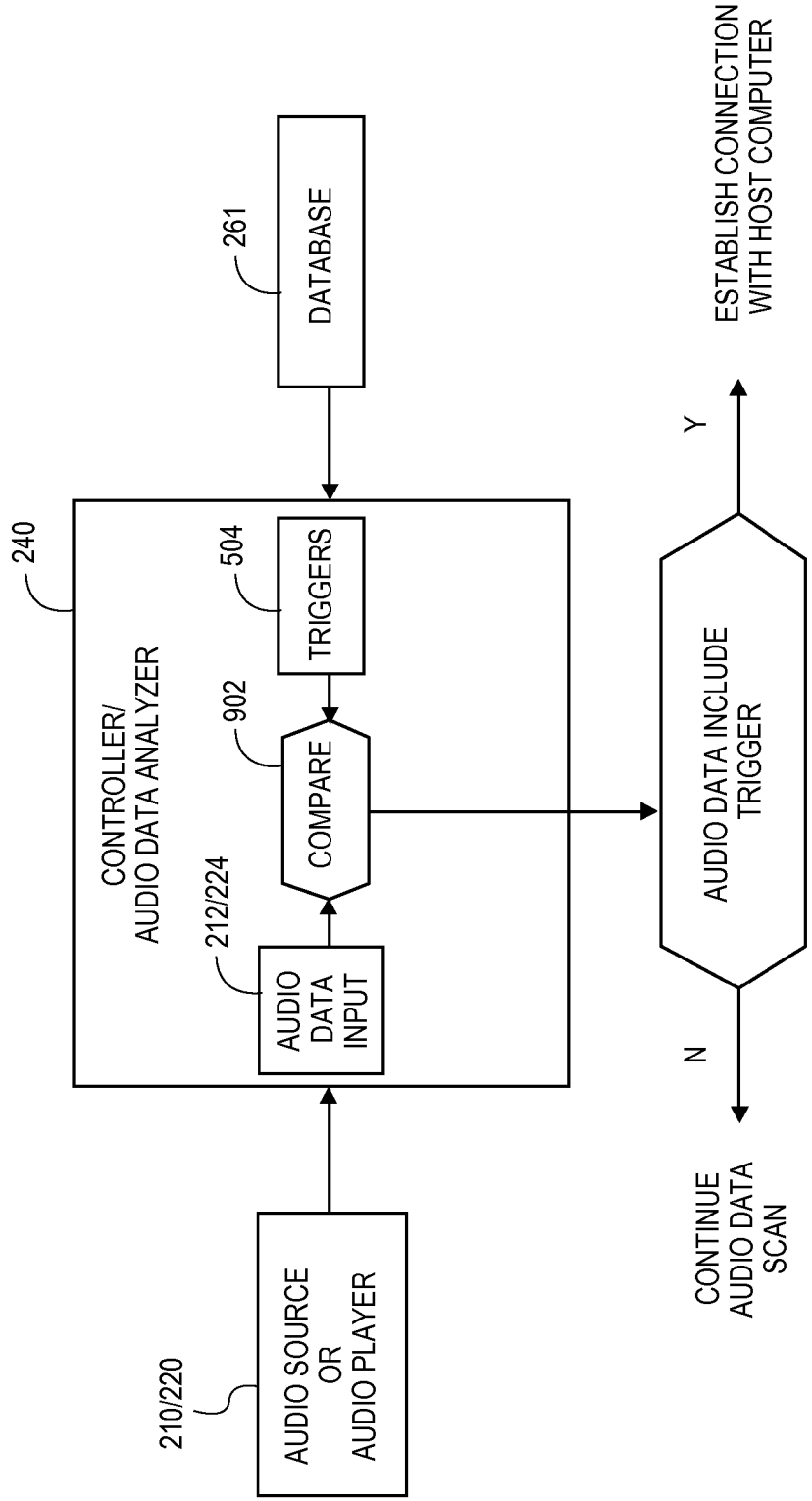
FIG. 9 further illustrates components of systems for audio-visual synchronization and how embodiments that analyze original, unmodified audio data determine whether the original, unmodified audio data includes any triggers or pointers.

Referring again to FIG. 4, 404, and with further reference to FIG. 9, audio data 212 is provided as first input to controller 240 or synchronization program 242. Audio file input may be in digital or electronic form (e.g. with the system configuration shown in FIG. 2 in which the audio data 212 is received directly from source 210) or analog form (e.g., with the system configuration shown in FIG. 3 in which audio data 212 is played and analog sound generated by speaker 302 is detected by microphone 304 of controller 240).

Figure 10A:
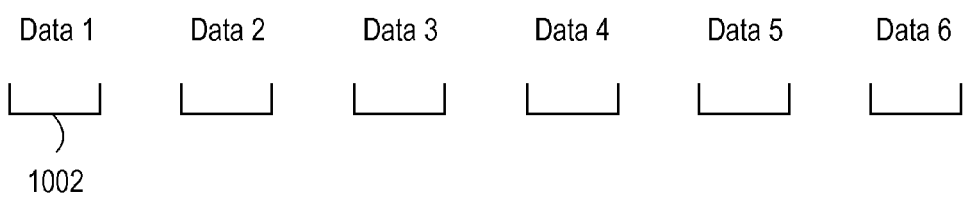
Figure 10B:
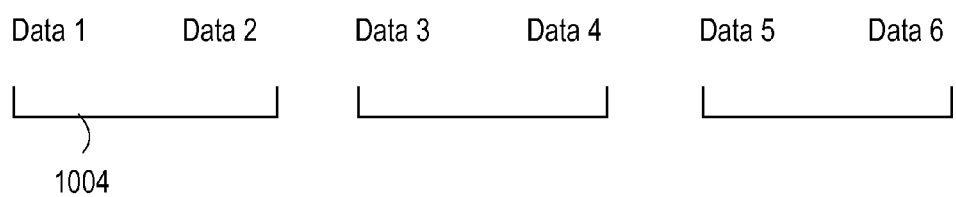
Figure 10B:
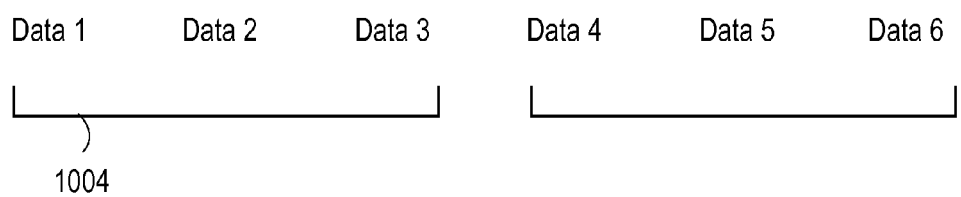

Referring again to FIG. 4, at 406, controller 240 reads or scans input of audio data 212. Referring to FIG. 10A, controller 240 may scan each individual data element of the audio data 212, e.g. each word or number 1002 (generally, "word") of audio data 212 (generally illustrated as "Data 1," Data 2," etc. in FIGS. 10A-C) Referring to FIG. 10B, in another embodiment, controller 240 reads or scans groups of words, e.g., groups 1004 of two words 1002 as shown in FIG. 10B, groups 1004 of three words 1002 as shown in FIG. 10C, and so on. Embodiments may also involve a combination in which controller 204 reads or scans individual words 1002 as well as groups 1004 of words 1002 to identify individual words and phrases that are triggers 504.

FIGS. 10A-C illustrate reading or scanning of audio data 212 in a linear, sequential in which each word 1002 or group 1004 of words 1002 is read once by controller 240, which then proceeds to the next word 1002 or group 1004 of words 1002 with no overlap. Thus, each word 1002 or group 1004 is scanned a single time.

Figure 11A:
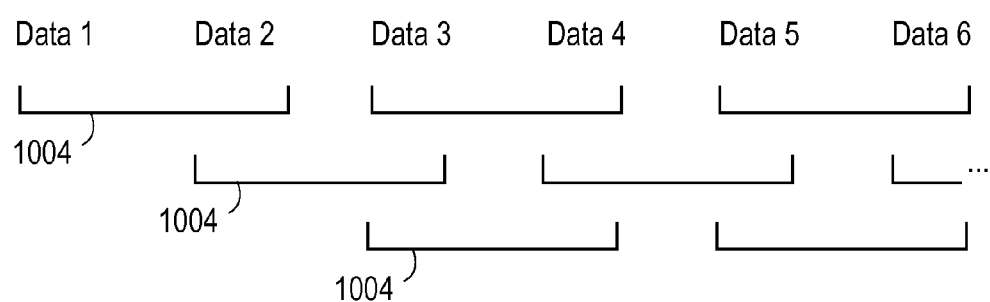
FIGS. 11A-B illustrate further examples of how audio data can be read or scanned to identify triggers based upon certain words, groups of words or phrases and how a particular word, group of words or phrases may be scanned multiple times.
Figure 11B:
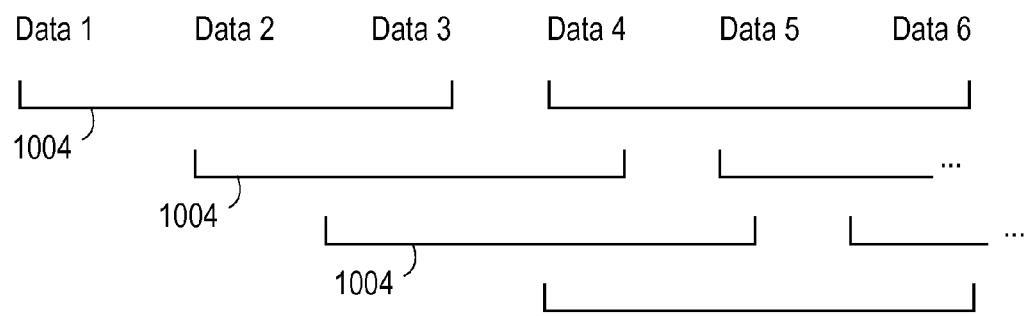

In another embodiment, referring to FIGS. 11A-B, controller 240 is configured to read groups 1004 of words 1002 with a sliding function such that there is overlap between groups 1004 and words 1002 are shared among multiple groups 1004. This scanning method provides a higher degree of analysis to identify phrases, which may be two, three, four and other numbers of words or terms long.

Referring again to FIGS. 4 and 9, at 408, in certain embodiments, controller 240 compares audio data 212 to pre-determined triggers 504. In certain embodiments, triggers 504 are self-identifying. For example, triggers 504 added to audio data 212 are known by the controller 240 to be a trigger 504 when audio data 212 is read by controller 240. In other embodiments, triggers 504 are not self-identifying since they are part of original, unmodified audio data 212 or relate to an attribute of audio data 212 other than audio content. For example, triggers 504 may be an original word or phrase of audio data 212 or a track time determined by track timer 803. Thus, in the cases in which triggers 504 are not self-identifying, controller 504 receives audio data 212 and compares 902 audio data with possible triggers 504 to determine whether audio data 212 that was ready by controller 240 includes a trigger 504. Triggers 504 that are compared 902 with audio data 212 can be downloaded from database 261 or another source or entered by host.

With continuing reference to FIG. 4, at 410, upon identifying a trigger 504 that was added to audio file 212, or determining that a particular word 1002 or group of words or phrase 1004 of unmodified audio data 212 is a trigger 504 based upon the comparison 902, controller 240 accesses a data store or database 261 of visual data 262 which, in the illustrated embodiment, is stored in a database 261 hosted by computer 260 and accessible through network 230 at 412.

Referring to FIG. 12A, according to one embodiment, local or remote database 261 includes a table of triggers 504 and respective pre-determined visual data 262, which may be in the form of a single image, a series of images or video. For example, referring to FIG. 12B, an audio book or e-book may include audio segments for each chapter of the original book, and triggers 504 may identify the beginning of each chapter. In this example, each trigger 504 identifying the beginning of each chapter is associated with or related to pre-determined visual data 262 in the form of one or more images or video—the trigger term "Chapter 1" is associated with Image 1, the trigger term "Chapter 2" is associated with Image 2, and so on. Triggers 504 may be associated with or related to other types of audio data 212 or audio data segments 502, and it should be understood that triggers 504 based on chapters of an audio book or e-book are provided as one example of how embodiments may be implemented.

Referring again to FIG. 4, at 414, controller 240 searches database 261 for the identified trigger 504, identifies the trigger 504 and corresponding pre-determined visual data 262 associated with identified or determined trigger 504. At 416, controller 240 downloads or retrieves identified pre-determined visual data 262 from database 261 and, if necessary, at 418, stores downloaded visual data 262 in memory or a storage device until it is ready to be provided to display 250.

Figure 13:
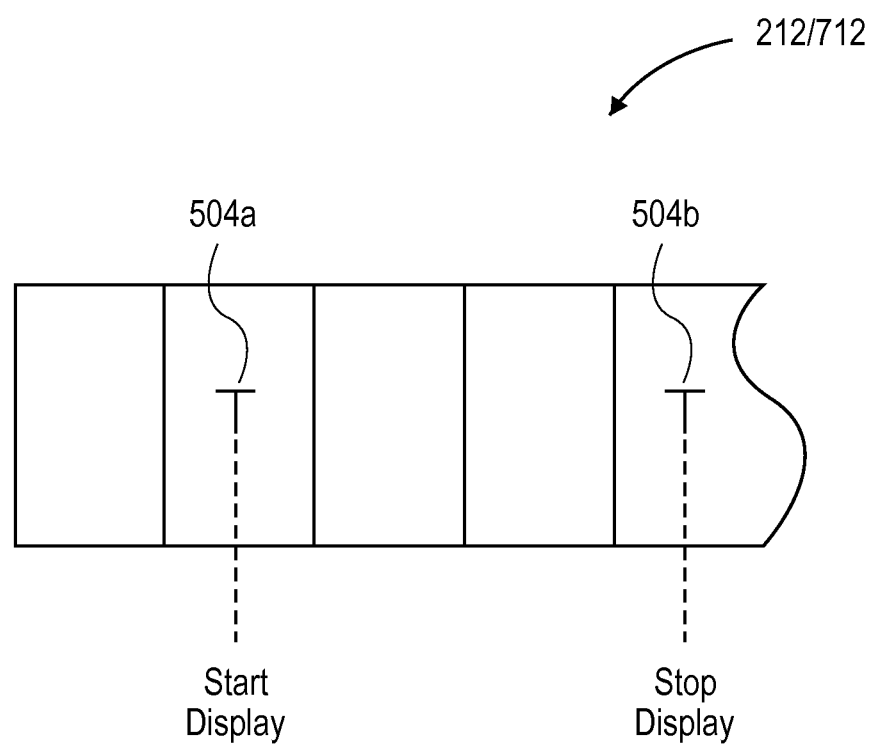
FIG. 13 illustrates one embodiment for determining how long visual data retrieved from the host computer should be displayed by utilizing a first trigger to identify when the visual data should be retrieved/displayed and a second trigger to identify when to stop display of the retrieved visual data.

At 420, controller 240 determines the duration of displaying pre-determined visual data 262. For this purpose, according to one embodiment, controller 240 controls display 250 such that each retrieved visual data 262 is displayed for a pre-determined amount of time, e.g., the same amount of time, such that no further determination regarding display time is required. According to another embodiment, and with further reference to FIG. 13, another or subsequent trigger 504 within audio data 212 indicates when retrieved visual data 262 should no longer be displayed. For example, as shown in FIG. 13, first trigger 504a indicates when visual data 262 retrieved from database 261 can be retrieved/displayed, and second, subsequent trigger 504b identifies the pre-determined location within audio data 212 at which displaying of visual data 262 identified using the first trigger 504a should be terminated. Controller, upon receiving triggers 504a, 504b, can control display 250 accordingly.

Thus, at 422, controller 240, having retrieved or downloaded pre-determined visual data 262 and knowing when the visual data 262 should be displayed and not displayed, sends an audio control or synchronization signal 245a to audio player 220 to control audible playing of audio data 212 by audio player 220 and also sends a visual control or synchronization signal 245b to display 250 at 424 such that, at 426, pre-determined visual data 262 identified based upon trigger 504 and downloaded from database 261 is played with a pre-determined segment 502 of audio data 212 played by audio player 220 according to respective audio and visual control/synchronization signals 245a, 245b.

Embodiments may be implemented in different ways such that retrieved or downloaded visual data 262 is synchronized and displayed with audio data 212 such that visual data 262 is displayed with playing of at least a portion of audio data 212 or from the beginning of playing audio data 212.

Figure 14A:
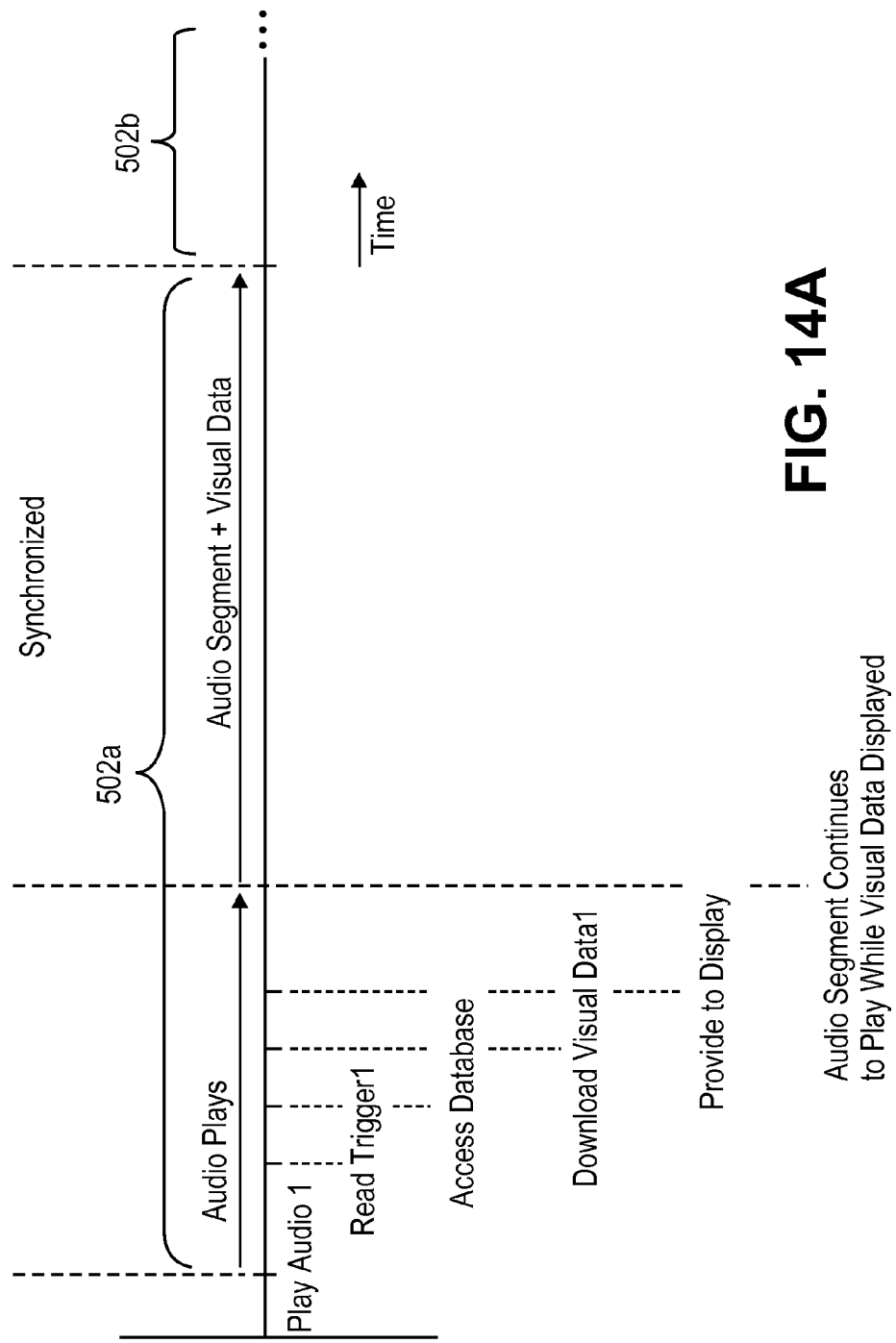
FIGS. 14A-B are timing diagrams illustrating how triggers can be used to initiate access of a host computer to retrieve visual data and when that visual data is displayed.

Referring to FIG. 14A, according to one embodiment, an audio segment 502 including trigger 504 begins to play, and associated visual data 262 is retrieved from database 261 and displayed while audio data segment 502 is played such that there is at least partial overlap between audio data segment 502 and visual data 262. More particularly, as shown in FIG. 14A, systems constructed according to embodiments may be configured such that when audio data 212 is provided from source 210 to audio player 220 and/or to controller 240, audio player 220 begins playing 1402 a segment 502 of audio data 212 upon receipt of audio data 212. Controller 240 receives and reads audio data 212 as it is received and identifies trigger 504 within the first audio data segment 502, retrieves pre-determined visual data 262, provides retrieved visual data 262 to display 250, and controls display 250 such that retrieved visual data 262 is displayed 1404 after playing 1402 if audio segment 502 has already begun but while segment 520 still audibly plays 1402. While this embodiment provides for a degree of synchronization, the delay between the time the trigger 504 is identified and the time the retrieved visual data 262 is displayed 1404 can be reduced or minimized with a fast network connection 230b between controller 240 and computer 260 such that visual data 262 is displayed close in time to the location of trigger 504. While the embodiment illustrated in FIG. 14A may provide an impression of seamless audio-video synchronization that is suitable for various audio-visual presentations, in another embodiment, controller 240 reads audio data 212 in advance of being played.

Figure 14B:
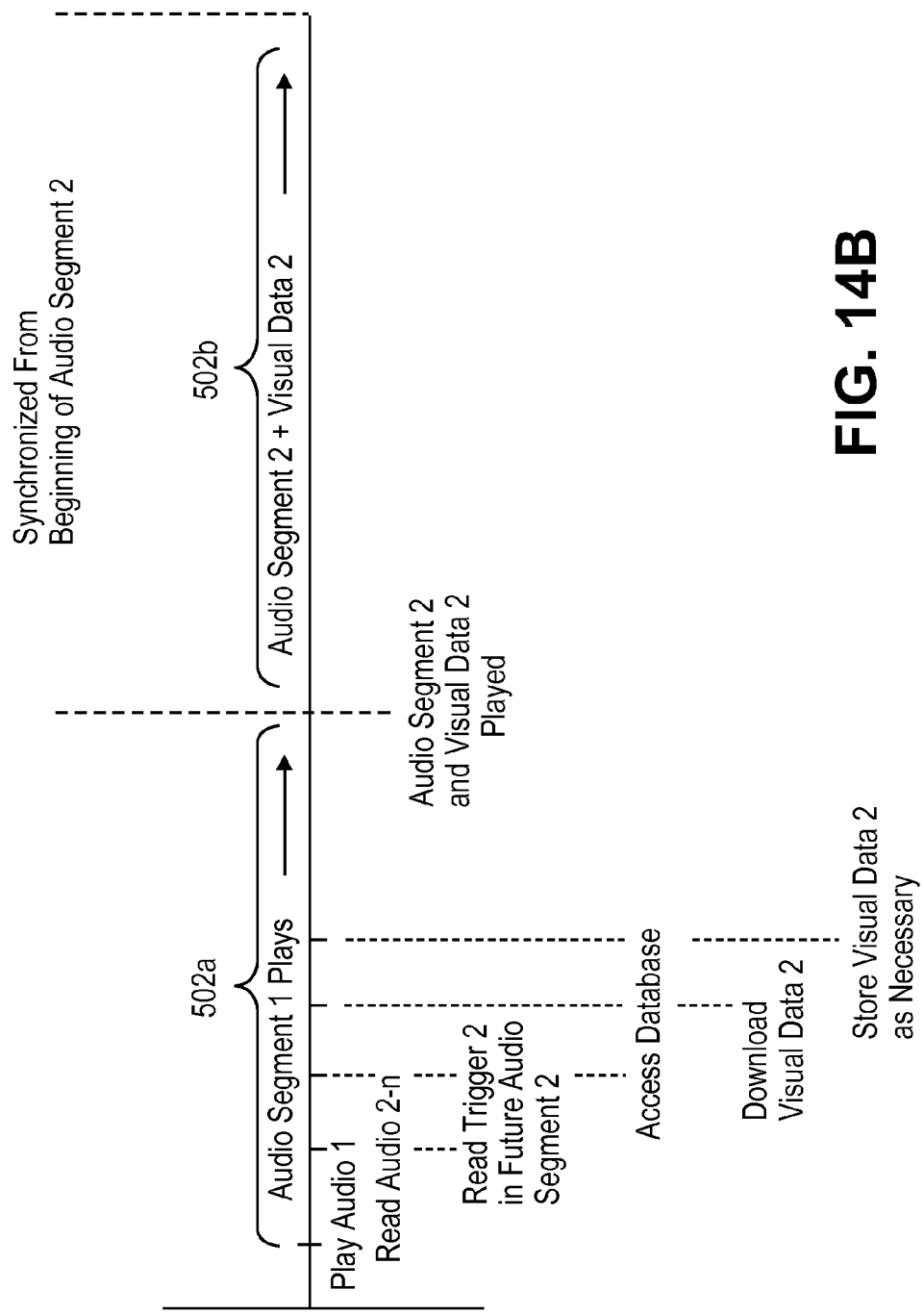

More particularly, referring to FIG. 14B, while a first audio segment 502a is being played by audio player 220, additional audio segments may be provided to controller 240, which scans audio data 212 in advance of audio data 212 currently being played to identify future triggers 504. In the illustrated embodiment, audio player 220 has received and/or is playing audio segments 502a-b, and controller 240 is already scanning audio data 212 for audio segment 502c and has identified a trigger 504c within audio segment 502c. While segments 502a-b are playing, controller 240 accesses a local data store or database 261 with visual data 262 or via network 230b, identifies pre-determined visual data 261 corresponding to trigger 504c within audio segment 502c, downloads pre-determined visual data 262c, and has the retrieved or downloaded data 262c ready for display 250 when audio player 220 begins to play audio segment 502c. According to one embodiment, retrieved or downloaded data 262c can be stored in memory or a storage device of controller 240, and when audio player 220 reaches trigger 504c or shortly before that time, controller 240 can provide retrieved pre-determined visual data 262c to display 250 such that visual data 262c is displayed when audio player 220 plays through part of audio segment 502c to reach trigger 504c.

Thus, with these embodiments, retrieved and stored or queued visual data 262c can even be displayed before audio player 220 reaches trigger 504c, at the time trigger 504c is reached or thereafter, thus providing additional control and audio-visual synchronization options.

Figure 15:
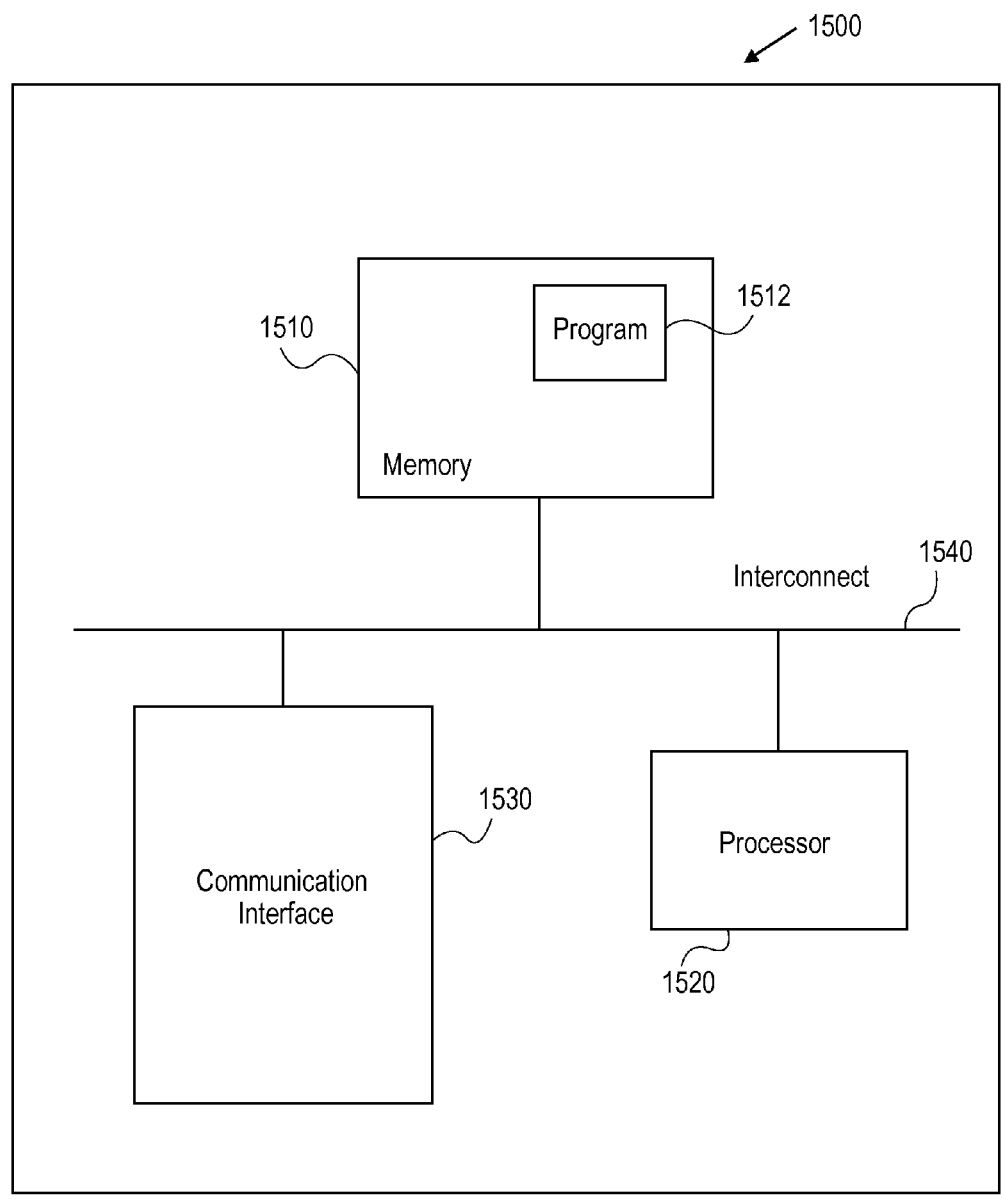
FIG. 15 is a system diagram of a computing apparatus that may be utilized by various system components.

FIG. 15 generally illustrates components of a computing apparatus 1500 that may be included in or utilized by one or more systems described herein. Such computing components may be, or include or utilize, a personal computer system, a desktop computer, a laptop or notebook computer, a mainframe computer system, a handheld computer, a workstation, a network computer, a consumer device, a mobile or cellular phone, a personal digital assistant (PDA), a Smartphone, an audio player, a display device, an e-book reader, an audio book player, a PDA phone, a two-way paging device, an application server, a storage device, a peripheral device such as a switch, modem, router, or other suitable computing or communications device.

Components of a computing device 1500 includes a memory 1510, program instructions 1512, a processor or controller 1520, a network or communications interface 1530, and connections or interconnect 1540 between such components. For example, memory 1510 may be or include one or more of cache, RAM, ROM, SRAM, DRAM, RDRAM, EEPROM and other types of memory. Processor unit 1520 may be or include multiple processors, a single threaded processor, a multi-threaded processor, a multi-core processor, or other type of processor. Depending on the particular system component (e.g., whether the component is a computer or a hand held mobile communications device), interconnect 1540 may include a system bus, LDT, PCI, ISA, or other types of buses, and the communications or network interface may, for example, be an Ethernet interface, a Frame Relay interface, or other interface. Network interface 1530 may be configured to enable a system component to communicate with other system components across a network 230 which, as explained above, may be a wireless or various other networks and one or combinations of networks. It is understood that any component of system 1500 may be located remotely and accessed via a network. Accordingly, the system configuration provided in FIG. 15 is provided for ease of explanation and illustration to generally illustrate system components that may be utilized in various embodiments.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW, or other carrier capable of retaining computer readable information. The processor 1520 executes program instructions 1512 within memory 1510 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, embodiments may be implemented in various environments that utilize different audio players and displays. According to one embodiment, system components are integrated inside of an automobile which may include a CD player for reading audio data stored on a CD or a hard drive for storing music files such as mp3 and other music files. The controller can be incorporated into the stereo control system which, according to embodiments, may interface with a heads-up display that projects an image onto a windshield of the automobile. Visual data can be retrieved from a hard drive within the automobile or from a remote database accessible via a network using a communication system of the automobile.

Thus, for example, an audio file in the form of a song about a hot rod may be modified to include triggers or the controller can detect triggers based on particular words or lyrics of the song such that when a lyric of "my hot rod" is played or a manually inserted trigger is read, the controller accesses a data store or database, which may be a local data store or database or one that is accessible through a wireless network, to access the pre-determined visual data associated with that trigger (e.g., an image or photo of a 1957 Chevrolet), which is provided from the controller to the heads-up display such that while the song is playing, or during the particular lyric, an image of a 1957 Chevrolet is displayed by the heads-up display. Further, if the pre-determined visual data includes a series of images or a video, the series of images may be projected onto the windshield at the same or different windshield locations, or a video may be presented on the windshield. Further, while embodiments are described with reference to a heads-up display, the pre-determined visual data may also be displayed on another display within the automobile such as a navigation screen or a rear entertainment screen.

In another embodiment, an advertisement associated with the audio data can be displayed on the heads up display or another display. The advertisement may relate to a new automobile or consumer goods, as examples.

As another example, embodiments may be utilized to supplement audio books or e-books audibly played with e-book readers to retrieve images associated with triggers within electronic books that are audibly played to a user. For this purpose, system components can be incorporated into an e-reader such as an IPAD or a KINDLE e-reader device, and the e-reader device so configured could access a local or remote data store or database to retrieve or download data from a source to receive audio data, receive a list of triggers, compare the audio data with the list of triggers, and access the database to retrieve or download pre-determined visual data associated with triggers.

Further, embodiments may be incorporated into such e-reader devices such that visual data is downloaded and stored to the e-reader before the audio is played. When the audio is played, the associated visual data identified by triggers can be retrieved from the locally stored and previously acquired visual data. For this purpose, an applet executing on the e-reader can be used to link or connect visual data to associated triggers. Further, such "offline" embodiments may be useful in situations such as when users are on an airplane and network access is not provided or permitted.

Additionally, while embodiments are described with reference to displaying retrieved visual data on a display of an e-reader device, computer or automobile display, in another embodiment, the audio data can be played by a first device, and the controller can transmit the retrieved visual data to another display device such as a nearby television or computer configured with a software program that can display data received from the controller. For this purpose, controllers may interface with a computer of a cable or satellite television company to display the pre-determined visual data.

Embodiments maybe implemented in larger applications and environments to coordinate and synchronize presentation of audio data (e.g., playing of music in a downtown area, synchronizing audio-visual data of large advertisements or billboards, playing of music during a concert, at a social event or venue or religious service. As another example, embodiments may be utilized in sports arenas to listen for certain cues or triggers related to a sporting event and then display images, e.g., on a mobile communication device. For example, during a baseball game, the famous "Take Me Out To The Ball Game" song may be played during the seventh inning stretch. Upon hearing this trigger phrase, embodiments may be utilized to display images of various past and current ballparks while the song is sung or played.

Additionally, while embodiments have been described with reference to audible words or phrases, embodiments may be configured to detect certain sounds (as opposed to words or phrases). For example, upon hearing a dog bark, images of various dogs (or the particular dog barking if such associations are made) can be displayed on a mobile communication device. As another example, embodiments may be configured to listen to engine noises of an automobile, and upon detecting an abnormal sound as a trigger, a mobile communication device may display a message to the user that the user should see an automobile mechanic.

Moreover, while embodiments have been described with reference to triggers that are audible to the human ear, embodiments may also utilize triggers that are beyond the range of human hearing.

While multiple embodiments and variations of the many aspects of the invention have been disclosed and described herein, such disclosure is provided for purposes of illustration only. Where methods described above indicate certain events occurring in certain order, those of ordinary skill in the art having the benefit of this disclosure would recognize that the ordering of certain process elements may be modified to be performed in different orders and/or in concurrently, and that such modifications are in accordance with the variations of the invention. Thus, the methods shown in various flow diagrams are not intended to be limited to a particular sequential order, particularly in instances in which certain process elements may or may not be performed or may be performed simultaneously. Accordingly, embodiments are intended to exemplify alternatives, modifications, and equivalents that may fall within the scope of the claims.

What is claimed is:

1. A computer-implemented method for audio-visual synchronization, the method comprising computer-implemented steps of:
    receiving an audio file from a first source, wherein an audio player of a user also receives the audio file;
    identifying, at a pre-determined location within the audio file, a trigger indicating when stored pre-determined visual data should be retrieved from a second source different than the first source;
    accessing the second source through a network, the second source comprising data store or database storing visual data;
    searching the data store or database of the second source to identify visual data associated with the identified trigger indicating when stored pre-determined visual data should be retrieved from the second source different from the first source;
    receiving the identified pre-determined visual data from the second source through the network; and
    coordinating playing of the audio file with the audio player and providing the received pre-determined visual data to a display such that the visual data is displayed with a pre-determined segment of the audio file played by the audio player.

2. The method of claim 1, the audio file being received from the first source comprising server of a website.

3. The method of claim 1, the audio file being received from the first source comprising a storage device of an automobile.

4. The method of claim 3, the playing of the audio file being coordinated with display of the pre-determined visual data by a heads up display unit on a windshield of the automobile.

5. The method of claim 1, the audio file comprising data of an audio podcast.

6. The method of claim 1, the audio file being played by an audio player comprising a mobile communication device.

7. The method of claim 1, the pre-determined visual data comprising an image or a series of images.

8. The method of claim 1, the trigger comprising a pre-determined time into the audio file.

9. The method of claim 1, the trigger comprising an original, unmodified pre-determined word or phrase of the audio file.

10. The method of claim 9, the audio player comprising a speaker, wherein sounds generated by the speaker during playing of the audio file are detected by a microphone, and an output of the microphone is received and analyzed to identify the trigger within the audio file.

11. The method of claim 9, the trigger being identified based at least in part upon the audio file data and independently of sounds generated by a speaker of the audio player.

12. The method of claim 9, the trigger comprising a pre-determined word within the audio file.

13. The method of claim 9, the trigger comprising a group of words.

14. The method of claim 9, wherein non-overlapping audio file segments are scanned to identify the trigger such that each word or group of words in the audio file is scanned a single time.

15. The method of claim 1, further comprising modifying the audio file by embedding the trigger within the audio file at the pre-determined location.

16. The method of claim 1, wherein the trigger is associated with a pre-determined segment of the audio file, and the pre-determined visual data is retrieved from the data store or database and displayed before playing of the pre-determined segment begins.

17. The method of claim 1, wherein the trigger is associated with a first segment of the audio file, and the pre-determined visual data is retrieved from the data store or database and displayed during playing of the first segment.

18. The method of claim 1, the audio player playing a first segment of the audio file, the first segment being received, wherein the trigger of the first segment is identified, the data store or database is accessed, and the pre-determined visual data is identified and displayed during playing of the first segment.

19. The method of claim 1, the audio player playing a first segment of the audio file, a second segment of the audio file being received while the first segment is playing, wherein the trigger of the second segment is identified, the data store or database is accessed and the pre-determined visual data is identified during playing of the first segment and before playing of the second segment.

20. The method of claim 19, further comprising storing pre-determined visual data retrieved from the data store or database during playing of the first segment.

21. The method of claim 1, the pre-determined visual data being displayed for a pre-determined amount of time.

22. The method of claim 1, the audio file comprising a second trigger indicating a length of time the pre-determined visual data should be displayed.

23. The method of claim 1, the pre-determined visual data being identified without input by the user.

24. The method of claim 1, the data of the audio file being continuously analyzed to identify triggers, access the data store or database, and identify respective pre-determined visual data in real time while receiving the audio file.

25. The method of claim 1, the audio player comprising a display, wherein playing of the audio file and display of the pre-determined visual data by the same audio player are coordinated.

26. The method of claim 1, wherein playing of the audio file by the audio player and display of the pre-determined visual data by a different and separate device are coordinated.

27. The method of claim 1, the pre-determined visual data comprising an advertisement.

28. The method of claim 1, the audio file being received from the first source comprising a portable electronic or optical storage media.

29. The method of claim 1, the audio file comprising data of the first source comprising an audio book.

30. The method of claim 1, the audio file comprising data of the first source comprising a mp3 file.

31. The method of claim 1, the audio file being played by the first source comprising an electronic book reading device capable of wireless or cellular communication.

32. The method of claim 1, wherein overlapping audio file segments are scanned utilizing a sliding function such overlapping words or groups of words are scanned to identify the trigger.

* * * * *